No. 759,550. PATENTED MAY 10, 1904.
C. J. REED.
SECONDARY BATTERY ELECTRODE.
APPLICATION FILED JAN. 16, 1901.
NO MODEL.

WITNESSES:
C. L. Belcher
Birney Hines

INVENTOR
Charles J. Reed
BY
Wesley G. Carr
ATTORNEY.

No. 759,550. Patented May 10, 1904.

UNITED STATES PATENT OFFICE.

CHARLES J. REED, OF PHILADELPHIA, PENNSYLVANIA.

SECONDARY-BATTERY ELECTRODE.

SPECIFICATION forming part of Letters Patent No. 759,550, dated May 10, 1904.

Application filed January 16, 1901. Serial No. 43,545. (No model.)

*To all whom it may concern:*

Be it known that I, CHARLES J. REED, a citizen of the United States, residing at Philadelphia, in the county of Philadelphia and State of Pennsylvania, have invented new and useful Improvements in Secondary-Battery Electrodes, of which the following is a specification.

My invention relates to secondary batteries, and particularly to lead plates employed as electrodes of such batteries.

The object of my invention is to provide a plate which shall have a large amount of effective surface for a given weight and size of electrode and which shall also have large current-carrying capacity and considerable mechanical strength and consequent stability in use.

With these ends in view I have devised an electrode in the form of a plate composed of a plurality of panels of thin metal so disposed as to present a large expanse of surface and relatively thick strengthening and current-carrying ribs, all formed of the same material and constituting an integral structure.

The battery in connection with which my invention is intended to be used is of the Planté type, in which the active material is formed on the plate by electrolytic action, as distinguished from the type of battery in which the active material is mechanically applied.

I have illustrated my invention in the accompanying drawings, in which—

Figure 1:
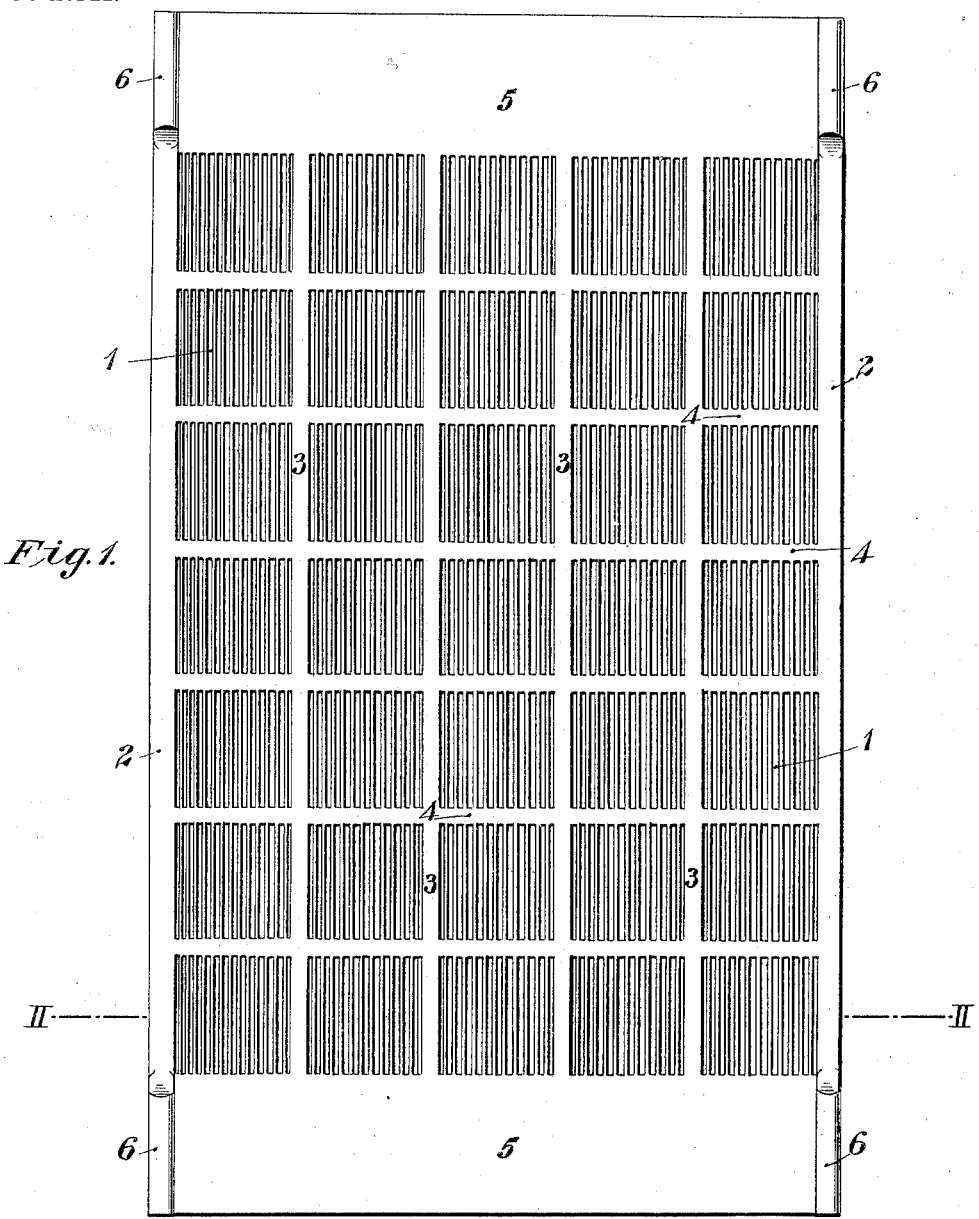
Figure 2:

Figure 1 is a side elevation of a plate constructed in accordance with my invention, and Fig. 2 is a sectional view taken on line II II of Fig. 1.

As shown in the drawings, the plate comprises a plurality of panels 1, of thin metal, the exposed surfaces of which are angularly disposed with reference to the plane of the plate, comparatively heavy side ribs 2, a plurality of longitudinal ribs 3, a plurality of lateral or transverse ribs 4, and projecting ends 5, having plain smooth surfaces. In comparatively small plates the extensions 5 may be removed, if desired, leaving only the projecting ends 6 of the side ribs 2 to serve as terminals for the plate. While the panels are shown as of corrugated formation, having narrow V-shaped grooves, it will be understood that grooves of different form or dimensions may be employed or that slots may separate the surface divisions of the panels, if desired. The panels present a greatly-increased amount of surface for the formation of active material over that presented by a smooth plate, and consequently the capacity of the plate for a given weight of material is very large. In view of the comparatively slight thickness of the material of the panel portions it is desirable to provide an additional means for carrying the current to the terminals and also for imparting sufficient rigidity to the plate so that it will be self-supporting and maintain its shape when in use. The thick ribs which surround and inclose the panels constitute the necessary current carrying and supporting means. The plate shown may be formed by any mechanism and in accordance with any method which may be found operative and useful; but I prefer to form the plate by passing material between corrugated rolls of suitable surface configuration and dimensions and to subsequently subject the plate to lateral edgewise compression in order to reduce the corrugation-grooves to the smallest practicable width. In forming plates of large size it will usually be found advisable to supply the lead to the forming-rolls in a molten condition; but in smaller plates it may be found feasible to form the plates from solid blanks of the proper width and thickness, provided sufficient heat be applied to either the blank or the rolls, preferably the latter, to promote the flow of the metal.

I have not deemed it necessary to illustrate herein the means for forming the plate; but reference may be had to my Patent No. 532,701, granted January 15, 1895, wherein are shown and described corrugated rolls for forming plates to be used as secondary-battery electrodes, it being understood that the structure of the rolls shown may be modified so as to provide the longitudinal and transverse ribs constituting parts of my present invention.

The edgewise compression of the rolled plate may be effected by means of any suitable press which will prevent buckling and will insure equality of pressure throughout the length and width of the plate, or, if desired, the plate may be used as it comes from the rolls without any subsequent pressure, there being no change in the relation between the capacity of the plate and its weight by reason of the edgewise compression, but only a decrease in the amount of space occupied.

I do not limit myself to any specific number or arrangement of strengthening-ribs or to the exact contour of the plate shown, these details of construction being susceptible of variation without affecting the mode of operation or result.

I claim as my invention—

A rolled and laterally-compressed secondary-battery plate comprising a plurality of corrugated panels and intervening strengthening-ribs and side ribs projecting beyond the panels and intervening ribs, said parts constituting an integral structure.

In testimony whereof I have hereunto subscribed my name this 10th day of January, 1901.

CHARLES J. REED.

Witnesses:
 GEO. V. MILLIGAN,
 E. E. ARNOLD.